A. P. MILLER.
Handle-Socket for Picks.
No. 211,419. Patented Jan. 14, 1879.
Fig: 1. 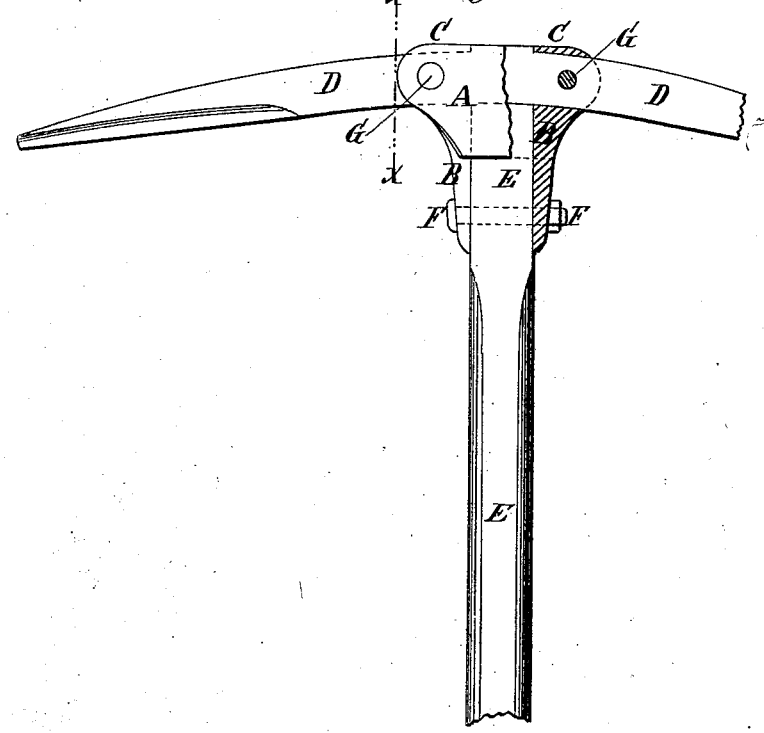 Fig: 2. 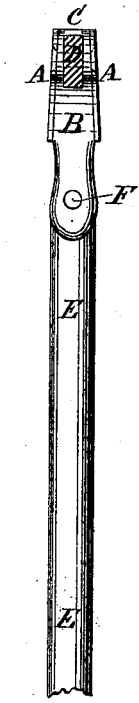
Fig: 3.
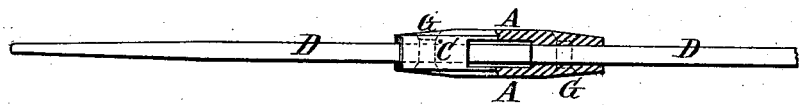
WITNESSES:
Achilles Schehl.
C. Sedgwick
INVENTOR:
A. P. Miller
BY Munn & Co
ATTORNEYS.

UNITED STATES PATENT OFFICE.

AMBROSE P. MILLER, OF HOBOKEN, NEW JERSEY.

IMPROVEMENT IN HANDLE-SOCKETS FOR PICKS.

Specification forming part of Letters Patent No. 211,419, dated January 14, 1879; application filed June 19, 1878.

*To all whom it may concern:*

Be it known that I, AMBROSE P. MILLER, of Hoboken, in the county of Hudson and State of New Jersey, have invented a new and useful Improvement in Handle-Sockets for Picks, Cold-Chisels, Tamping-Bars, Adzes, &c., of which the following is a specification:

Figure 1 is a side view, partly in section, of my improved handle-socket, shown as applied to a pick. Fig. 2 is an edge view of the same, the pick-bar being shown in cross-section through the line $x\ x$, Fig. 1. Fig. 3 is a base view of the same, partly in section, to show the construction.

Similar letters of reference indicate corresponding parts.

The object of this invention is to furnish an improved handle-socket for picks, cold-chisels, tamping-bars, adzes, and other tools, which shall be so constructed as to enable the tools to be made easier and cheaper than when made in the usual way.

The invention consists in a handle-socket for tools, formed of the side plates, provided with holes to receive the fastening-rivets, the edge pieces provided with holes to receive the fastening-bolt, and the base-plate arranged to form openings for the tool and the handle, as hereinafter fully described.

I will describe the socket as being applied to a pick, but do not wish to limit myself to that application, as it is equally applicable to various other tools.

The socket is formed of two side plates, A, two edge pieces, B, and a base-plate, C. The side plates A are made wide toward their base, in the direction of the length of the tool D.

The parts A B C may be made of wrought-iron welded together, or the socket may be made of malleable iron.

Space is left between the ends of the edge pieces B and the base-piece C, to receive the pick bar or head D. Space is left between the edge-pieces B to receive the handle E, and the said pieces project beyond the side plates A, and have holes formed through them to receive the bolt F, by which the handle E is secured in and to the said socket.

The pick bar or head D is secured in the socket by rivets G, which pass through it and through the end parts of the side plates A.

The head D may be further secured in place by a projection upon its base to project through a hole in the center of the base-plate C, as shown in the drawings.

This construction enables the pick-bar D to be made wholly of steel, and avoids the necessity of forming an eye in it to receive a handle, and at the same time makes a firmer connection between the handle and tool.

Having thus described my invention, I claim as new and desire to secure by Letters Patent—

The two side plates A, the two edge pieces B, the base-plate C, and the bolts F G, combined to form a handle-socket, as shown and described, for the purpose specified.

AMBROSE P. MILLER.

Witnesses:
JAMES T. GRAHAM,
C. SEDGWICK.